US009841225B2

(12) United States Patent
Almeida et al.

(10) Patent No.: US 9,841,225 B2
(45) Date of Patent: Dec. 12, 2017

(54) LOW WATTAGE FLIPPER MULLION

(71) Applicant: WHIRLPOOL CORPORATION, Benton Harbor, MI (US)

(72) Inventors: Murilo P. Almeida, St. Joseph, MI (US); Joel Boeng, Florianópolis (BR); Darci Cavali, Evansville, IN (US); Christopher C. Cunningham, St. Joseph, MI (US); Vijaykumar Sathyamurthi, Stevensville, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

(21) Appl. No.: 15/073,987

(22) Filed: Mar. 18, 2016

(65) Prior Publication Data

US 2016/0273827 A1    Sep. 22, 2016

Related U.S. Application Data (60) Provisional application No. 62/135,971, filed on Mar. 20, 2015.

(51) Int. Cl.
| | |
|---|---|
| *A47B 96/04* | (2006.01) |
| *F25D 23/08* | (2006.01) |
| *F25D 23/02* | (2006.01) |

(52) U.S. Cl.
CPC ........... *F25D 23/087* (2013.01); *F25D 23/02* (2013.01); *F25D 2323/021* (2013.01); *Y02B 40/34* (2013.01)

(58) Field of Classification Search
CPC ........ F25D 23/028; F25D 23/02; F25D 23/08; F25D 2323/021; F25D 2201/12; F25D 2201/14; F25D 2400/407; E05D 13/1276

USPC ............................................................ 312/405
See application file for complete search history.

(56) References Cited

U.S. PATENT DOCUMENTS

| | | | | |
|---|---|---|---|---|
| 2,486,508 | A | * 11/1949 | Szymezyk | ............ F25D 17/062 220/592.08 |
| 2,767,040 | A | * 10/1956 | Kesling | ................. F25D 23/087 312/296 |
| 4,226,489 | A | * 10/1980 | Haag | ..................... E05C 19/161 312/296 |
| 4,288,135 | A | * 9/1981 | Buchser | ................ F25D 23/028 312/296 |
| 5,411,328 | A | 5/1995 | You | |
| 5,694,789 | A | 12/1997 | Do | |
| 7,008,032 | B2 | 3/2006 | Chekal et al. | |
| 7,178,293 | B2 * | 2/2007 | Kim | ......................... E06B 7/16 277/629 |
| 7,823,331 | B2 * | 11/2010 | Linkmeyer | ........... F25D 23/087 49/366 |
| 8,167,389 | B2 | 5/2012 | Han et al. | |
| 8,764,133 | B2 | 7/2014 | Park et al. | |

(Continued)

*Primary Examiner* — Stanton L Krycinski
*Assistant Examiner* — Timothy M Ayres
(74) *Attorney, Agent, or Firm* — Price Heneveld LLP (57) ABSTRACT

A flipper mullion for an appliance includes an outer cover coupled to a hinge, wherein the outer cover is rotationally operable between an extended position and a folded position relative to the hinge. A gasket engages at least a fastening portion of the outer cover, wherein the gasket and the outer cover cooperate to define an outer surface, and wherein an interior surface of a flexible portion of the gasket defines an insulating space that is positioned opposite a front surface of the outer cover.

19 Claims, 8 Drawing Sheets

(56) References Cited

U.S. PATENT DOCUMENTS

| | | | |
|---|---|---|---|
| 8,864,251 B2 | 10/2014 | Kuehl et al. | |
| 8,876,233 B2 | 11/2014 | Laible | |
| 8,926,032 B2* | 1/2015 | Kuehl | F25D 21/14 |
| | | | 312/401 |
| 9,121,635 B2* | 9/2015 | Mentasti | E05C 19/161 |
| 9,134,062 B2 | 9/2015 | Jung et al. | |
| 9,157,676 B2 | 10/2015 | Lee et al. | |
| 9,188,382 B2 | 11/2015 | Kim et al. | |
| 2005/0189726 A1* | 9/2005 | Shin | F25D 23/087 |
| | | | 277/628 |
| 2005/0242529 A1* | 11/2005 | Kim | F25D 23/087 |
| | | | 277/628 |
| 2008/0209812 A1 | 9/2008 | Lancry et al. | |
| 2009/0007587 A1* | 1/2009 | Lanzl | A47F 3/0434 |
| | | | 62/449 |
| 2012/0073321 A1 | 3/2012 | Davis et al. | |
| 2013/0241386 A1 | 9/2013 | Kim et al. | |

\* cited by examiner

LOW WATTAGE FLIPPER MULLION

This application claims priority to and the benefit under 35 U.S.C. §119(e) of U.S. Provisional Patent Application No. 62/135,971, filed on Mar. 20, 2015, entitled "LOW WATTAGE FLIPPER MULLION," the entire disclosure of which is hereby incorporated herein by reference.

FIELD OF THE INVENTION

The present disclosure generally relates to refrigerating appliances, and more specifically, a flipper mullion disposed between adjacent doors that enclose a single compartment of a refrigerating appliance.

BRIEF SUMMARY OF THE INVENTION

In at least one aspect, a refrigerating appliance includes a plurality of sidewalls and a back wall that define an interior compartment. First and second doors are hingedly attached to opposing sidewalls of the plurality of sidewalls, each of the first and second doors separately and selectively operable between respective open and closed positions, wherein a seam is defined between the first and second doors when each of the first and second doors is in the respective closed position. A flipper mullion is attached to the first door and extending across the seam defined between the first and second doors, wherein the flipper mullion is hingedly attached to the first door, and wherein the flipper mullion engages the second door when both of the first and second doors are in respective closed positions. A gasket defines a portion of an outer surface of the flipper mullion proximate the interior compartment, the gasket including a flexible portion that defines an insulating space within the flipper mullion.

In at least another aspect, a flipper mullion for an appliance includes an outer cover coupled to a hinge, wherein the outer cover is rotationally operable between an extended position and a folded position relative to the hinge. A gasket engages at least a fastening portion of the outer cover, wherein the gasket and the outer cover cooperate to define an outer surface, and wherein an interior surface of a flexible portion of the gasket defines an insulating space that is positioned opposite a front surface of the outer cover.

In at least another aspect, a door panel for an appliance includes an outer wrapper and an inner liner. A flipper mullion is attached to the inner liner and hingedly operable between an extended position, and a folded position. A gasket defines a portion of an outer surface of the flipper mullion proximate the interior compartment, the gasket including a flexible portion that defines an insulating space within the flipper mullion, wherein the gasket engages the inner liner when the flipper mullion is in the folded position.

These and other features, advantages, and objects of the present disclosure will be further understood and appreciated by those skilled in the art by reference to the following specification, claims, and appended drawings.

BRIEF DESCRIPTION OF THE DRAWINGS

The foregoing summary, as well as the following detailed description, will be better understood when read in conjunction with the appended drawings. For the purpose of illustration, there are shown in the drawings, certain embodiment(s) which are presently preferred. It should be understood, however, that the disclosure is not limited to the precise arrangements and instrumentalities shown. Drawings are not necessary to scale. Certain features of the disclosure may be exaggerated in scale or shown in schematic form in the interest of clarity and conciseness.

DETAILED DESCRIPTION

It is to be understood that the invention is not limited to the particular embodiments of the disclosure described below, as variations of the particular embodiments may be made and still fall within the scope of the appended claims. It is also to be understood that the terminology employed is for the purpose of describing particular embodiments, and is not intended to be limiting. Instead, the scope of the invention will be established by the appended claims.

Where a range of values is provided, it is understood that each intervening value, to the tenth of the unit of the lower limit unless the context clearly dictates otherwise, between the upper and lower limit of that range, and any other stated or intervening value in that stated range, is encompassed within the disclosure. The upper and lower limits of these smaller ranges may independently be included in the smaller ranges, and are also encompassed within the invention, subject to any specifically excluded limit in the stated range. Where the stated range includes one or both of the limits, ranges excluding either or both of those included limits are also included in the disclosure.

In this specification and the appended claims, the singular forms "a," "an" and "the" include plural reference unless the context clearly dictates otherwise.

Figure 1:
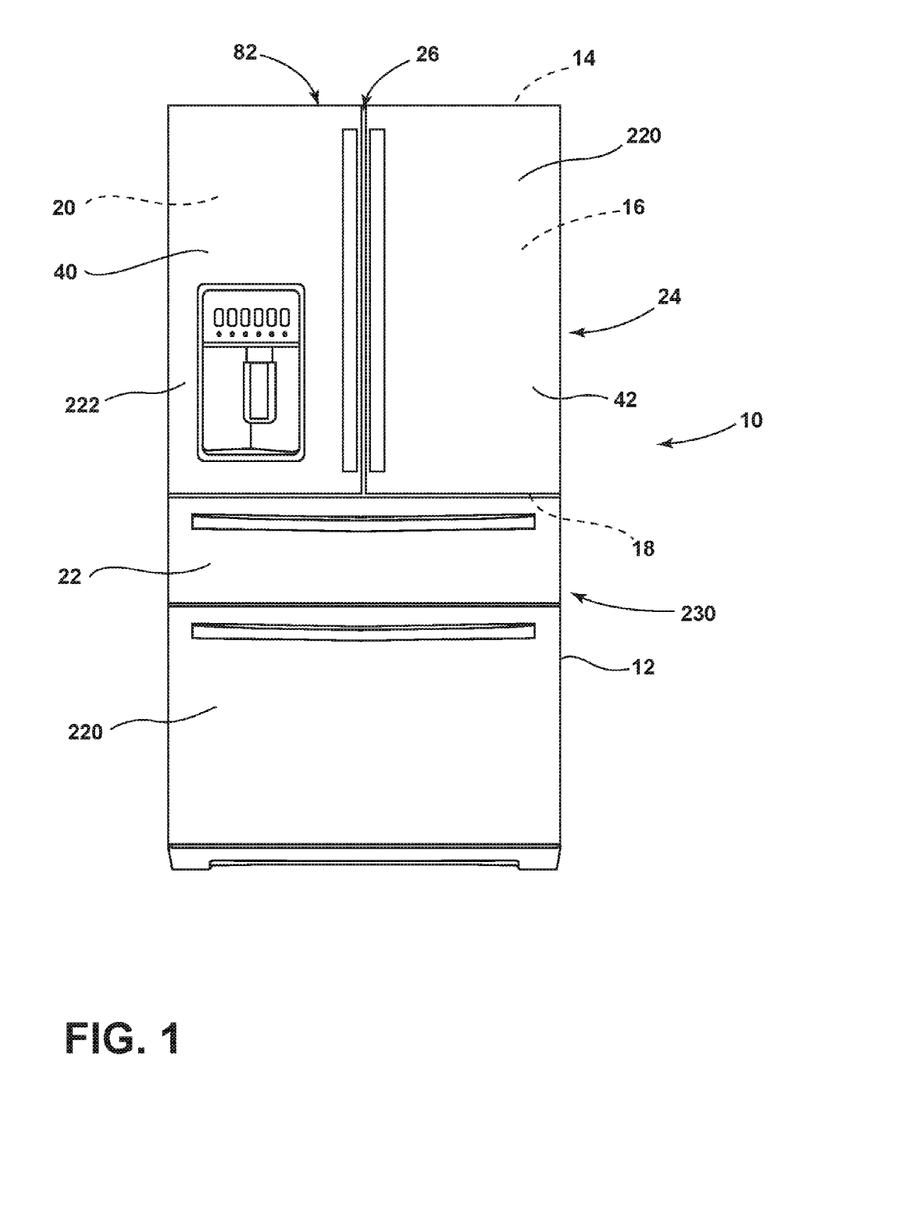
FIG. 1 is a front elevational view of a refrigerating appliance incorporating an aspect of the low wattage flipper mullion.
Figure 2:
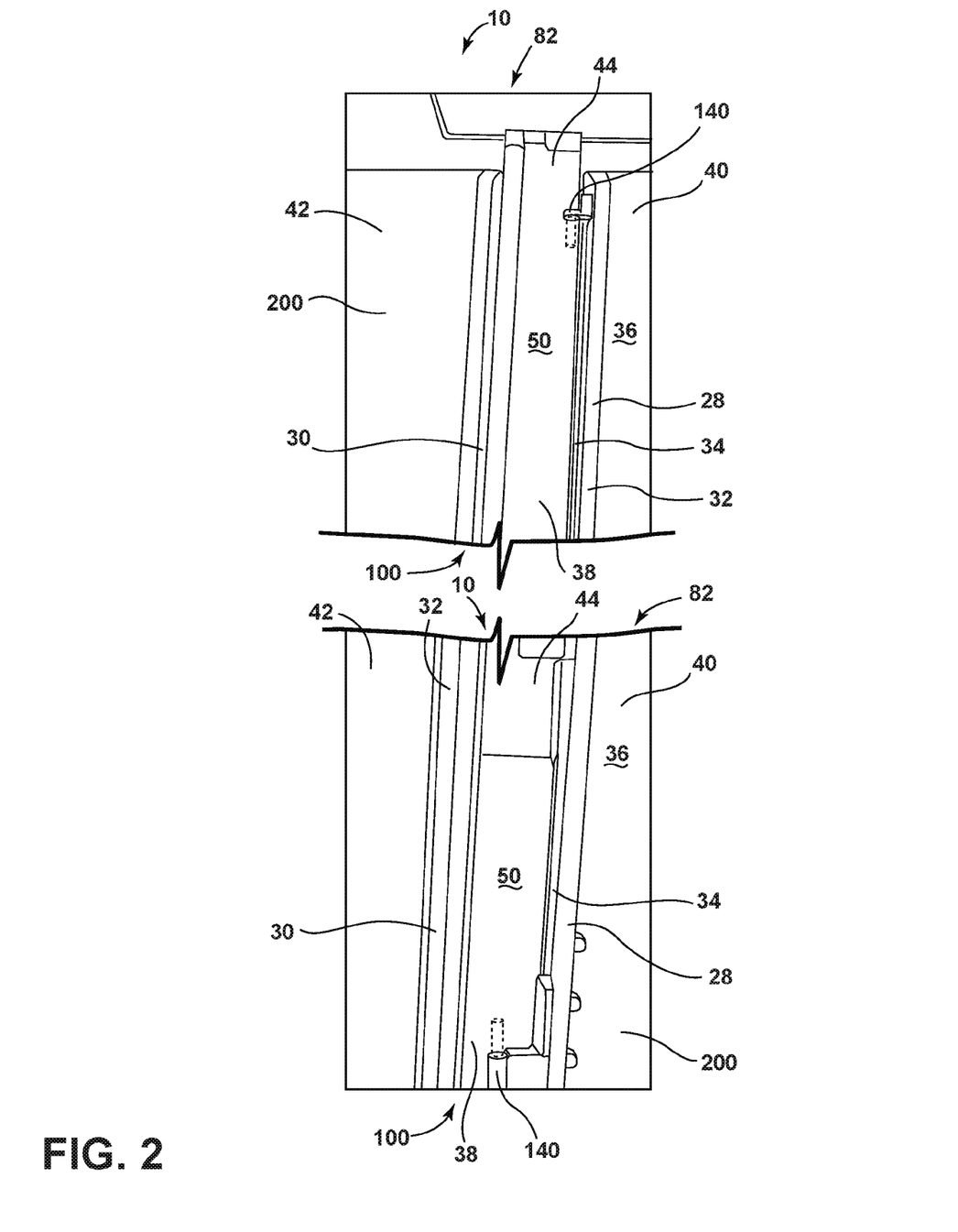
FIG. 2 is an interior elevational view of an aspect of the flow wattage flipper mullion.
Figure 3:
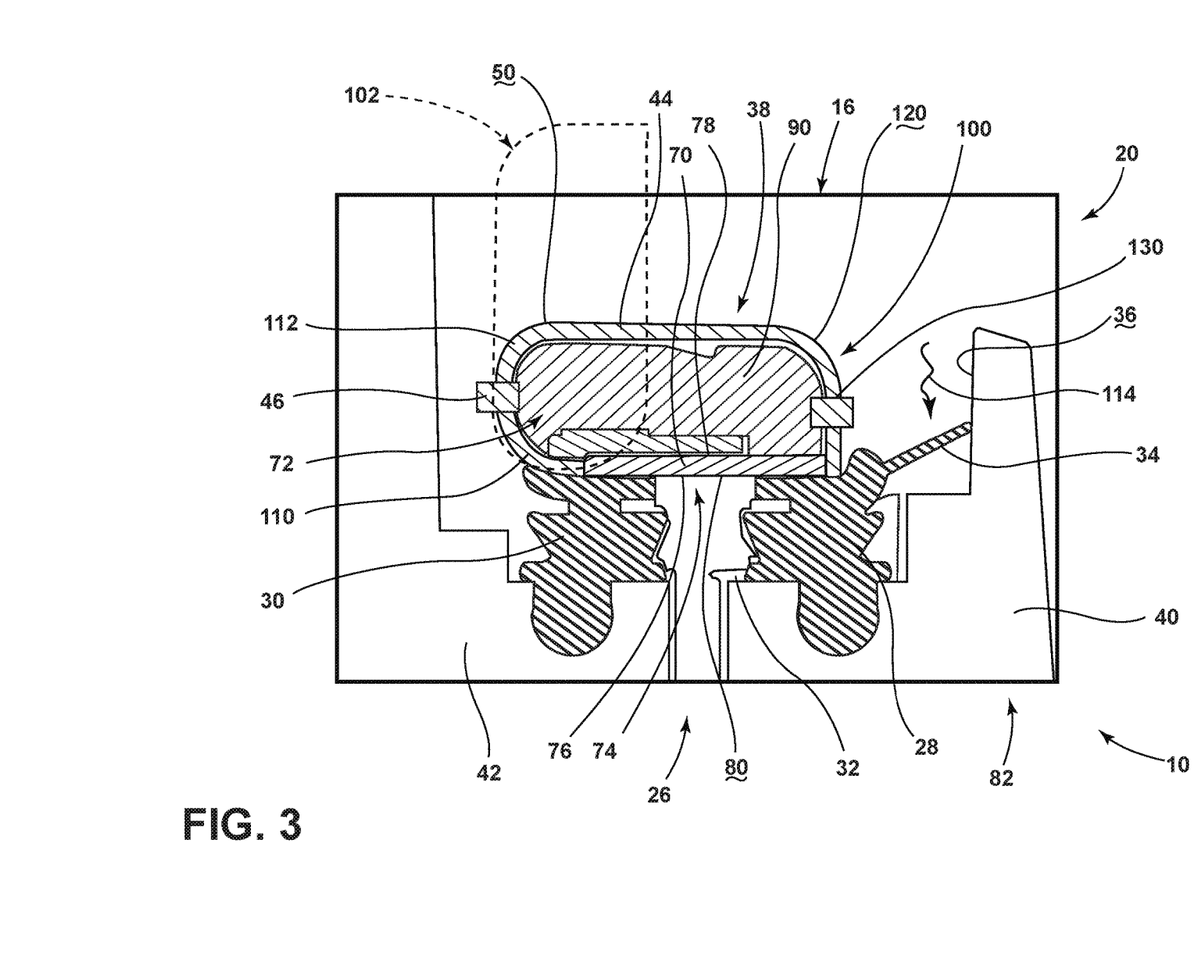
FIG. 3 is a cross-sectional view of an aspect of the low wattage flipper mullion.
Figure 4:
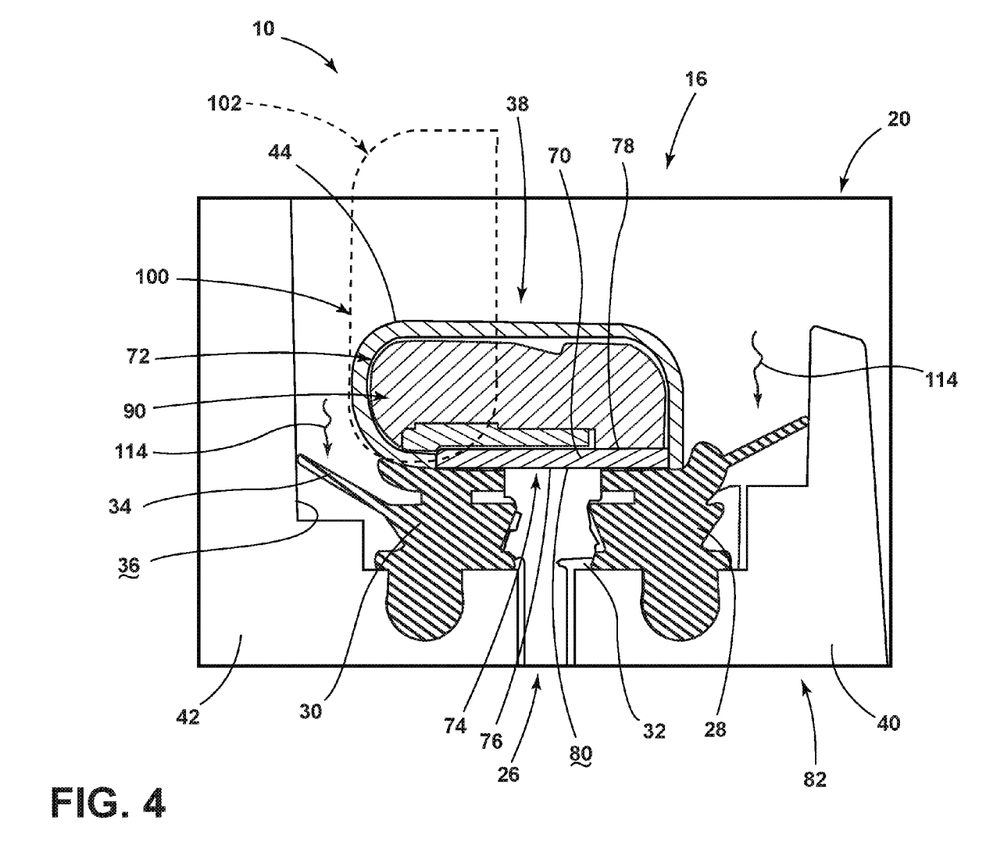
FIG. 4 is a cross-sectional view of an aspect of the low wattage flipper mullion incorporating at least one flap member.

With respect to FIGS. 1-3, a refrigerator is generally shown. In each of these embodiments, the refrigerating appliance 10 can include a plurality of sidewalls 12 that extends from a back wall 14, where the sidewalls 12 and back wall 14 define an interior volume 16. An intermediate partition 18 can extend through at least a portion of the interior volume 16 to define a plurality of temperature-controlled compartments. The temperature-controlled compartments can include, but are not limited to, a refrigerated compartment 20, a freezer compartment, a pantry compartment, and other various interior compartments of the refrigerating appliance 10. A plurality of doors 22 are operable to enclose each of the plurality of temperature-controlled refrigerated compartments 20. The plurality of doors 22 can include a pair of oppositely hinged doors 24 that cooperate to extend across the refrigerated compartment 20. The opposingly hinged doors 24 meet at a closed position 82 to define a seam 26 that extends between the pair of opposingly hinged doors 24.

Referring again to FIGS. 1-4, first and second gaskets 28, 30 are disposed along an edge 32 of each of the pair of opposingly hinged doors 24. The first and second gaskets 28, 30 are positioned proximate the seam 26. Additionally, each of the first and second gaskets 28, 30 includes a flap member 34 that extends outwardly from each of the first and second gaskets 28, 30, respectively, wherein each of the flap members 34 extends to engage an interior portion 36, such as an inner liner 200 (shown in FIGS. 7 and 8), of the refrigerated compartment 20. A flipper mullion 38 is configured to extend between the pair of opposingly hinged doors 24, where the flipper mullion 38 extends from the first door 40 of the pair of opposingly hinged doors 24 to the second door 42 of a pair of opposingly hinged doors 24 and is configured to at least partially cover the seam 26 extending therebetween.

Referring now to FIGS. 1-5, various aspects of the flipper mullion 38 can include an outer cover 44 having a thermal breaker 46 that extends along the length of the outer cover 44. A bubble gasket 48 can be disposed proximate an inside surface 50 of the flipper mullion 38 and at least partially extends through at least one bubble aperture 52 defined within the outer cover 44 of the flipper mullion 38. According to the various embodiments, the portion of the bubble gasket 48 that extends through the at least one bubble apertures 52 defines an air bubble 54 extending from the inside surface 50 of the outer cover 44.

Referring again to FIGS. 1-5, according to the various embodiments, the pair of opposingly hinged doors 24 are positioned in a lateral orientation, such that the seam 26 extends vertically and the flipper mullion 38 also extends vertically to at least partially cover the seam 26 between the opposingly hinged doors 24. It is contemplated, that in various embodiments, the opposingly hinged doors 24 can be positioned in a vertical orientation, such that the seam 26, and in turn, the flipper mullion 38, extends horizontally between the opposingly hinged doors 24. It is also contemplated, that in various embodiments, the flipper mullion 38 can extend between two adjacent doors 22 that cover a single refrigerated compartment 20, where the two adjacent doors 22 have a hinge 140 that is on the same side as the two adjacent doors 22 such that each of the two adjacent doors 22 swings open in the same direction. In embodiments where the doors 22 that extend across the refrigerated compartment 20 are vertically oriented, it is contemplated that the flipper mullion 38 extending between the seam 26 is oriented in a horizontal configuration.

Referring again to FIGS. 1-3 and 5-6, it is contemplated that, in various embodiments, the at least one bubble aperture 52 can include a plurality of bubble apertures 52 through which the bubble gasket 48 extends.

Referring again to the embodiments illustrated in FIGS. 2-8, within the flipper mullion 38, in order to prevent condensation from forming on the outer surface 120 of the flipper mullion 38, the flipper mullion 38 can include one or more electrical wires 70 that extend vertically through a cavity 72 of the flipper mullion 38. These electrical wires 70 are part of a heating assembly 74 that extends vertically through the flipper mullion 38 and connects to a metal plate 76 of the flipper mullion 38. The electrical wires 70 and the metal plate 76 cooperate to form a resistive heating element 78 that is positioned proximate an exterior surface 80 of the flipper mullion 38. It is contemplated that the metal plate 76 and the electrical wires 70 can extend substantially between the first and second gaskets 28, 30. In this manner, when each of the opposingly hinged doors 24 is in a closed position 82, the heating element formed by the metal plate 76 and the electrical wires 70 can be used to create heat to prevent condensation from forming on the exterior surface 80 of the flipper mullion 38. Such condensation, if not prevented, may accumulate and run as water droplets run down the exterior surface 80 of the flipper mullion 38 and potentially pool on portions of the refrigerating appliance 10 or portions of the floor around the refrigerating appliance 10.

Referring again to the embodiment illustrated in FIGS. 2-8, the outer cover 44 and metal plate 76 of the flipper mullion 38 form the cavity 72 of the flipper mullion 38 that is typically filled with some insulating material 90, such as foam, polyethylene, a vacuum insulated structure, a vacuum insulated panel, combinations thereof, or other similar insulating material 90. The flipper mullion 38 can be hinged on one side proximate one of the first or second gaskets 28, 30 of the first or second doors 40, 42. In this manner, when the first and second doors 40, 42 are moved to the open position, the flipper mullion 38 moves with the first door 40 of the pair of opposingly hinged doors 24, thereby moving the mullion away from the refrigerated compartment 20 such that the refrigerated compartment 20 can be easily accessed by the user without interference from the flipper mullion 38. Additionally, the flipper mullion 38 is configured to rotate to a parallel position 100 when the first door 40 is in the closed position 82.

In this parallel configuration, the exterior surface 80 of the flipper mullion 38 is substantially parallel with the first door 40. Accordingly, the exterior surface 80 of the flipper mullion 38 is configured to engage at least the first gasket 28 when the first door 40 is in the closed position 82, and also the second gasket 30 when both the first and second doors 40, 42 are in the closed position 82. When the first door 40 is moved to the open position, the flipper mullion 38 is configured to rotate to a perpendicular position 102, such that the first door 40 can be moved without having to move the second door 42.

Figure 5:
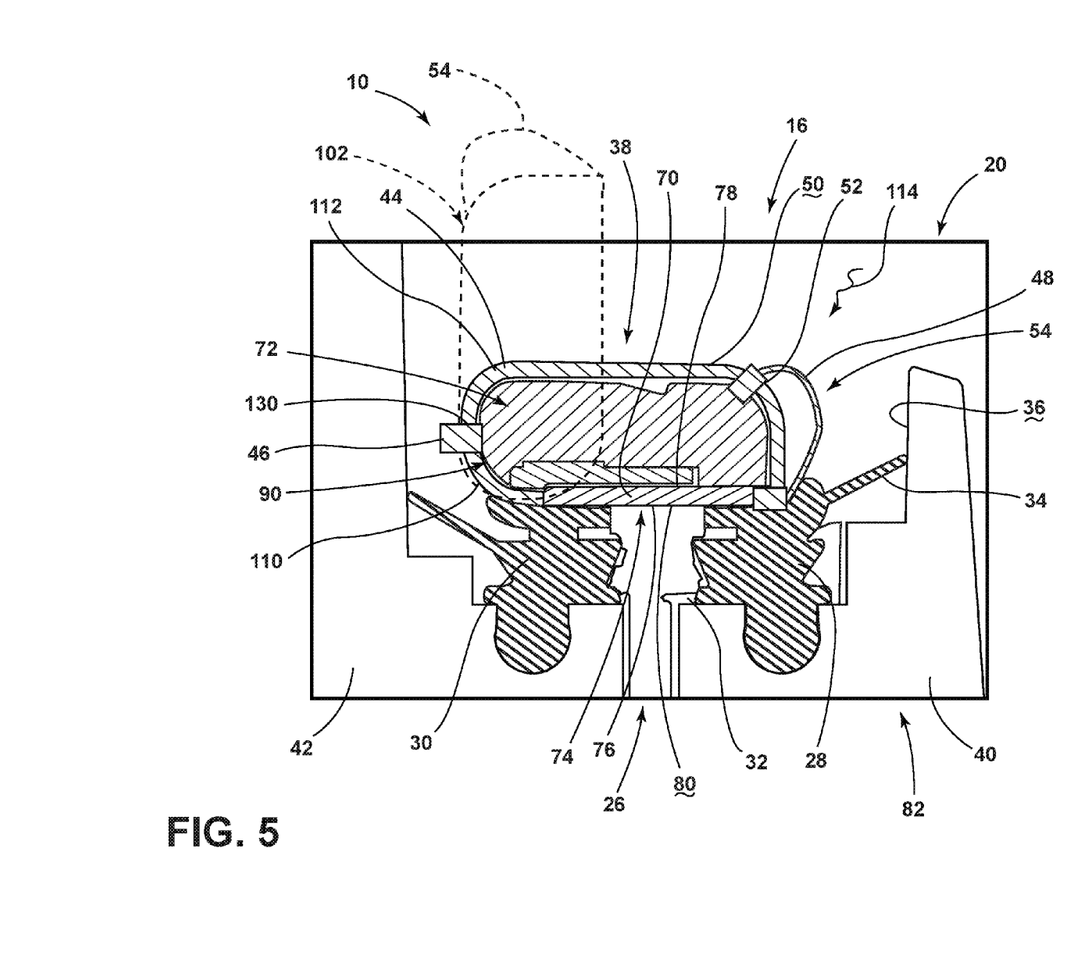
FIG. 5 is a cross-sectional view of an aspect of the low wattage flipper mullion incorporating at least one bubble gasket and at least one flap member.
Figure 6:
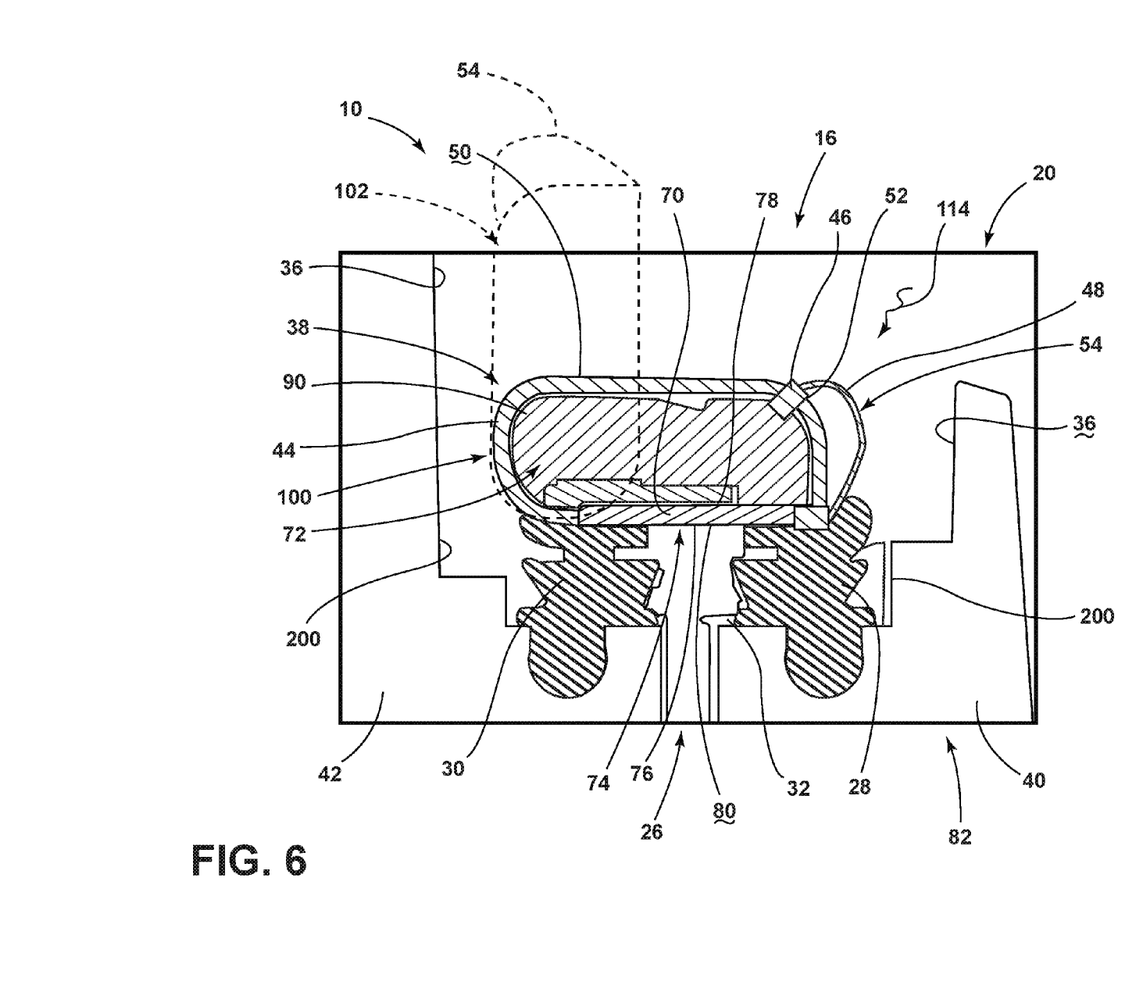
FIG. 6 is a cross-sectional view of an aspect of the low wattage flipper mullion incorporating at least one bubble gasket.

Referring again to the embodiment illustrated in FIGS. 3, 5 and 6, the breakers disposed within the cover of the flipper mullion 38 includes a thermal breaker 46 that extends vertically along the height of the flipper mullion 38. It is contemplated that the thermal breaker 46 can extend the full height of the flipper mullion 38 such that the outer cover 44 is separated into a front cover portion 110 and a rear cover portion 112, where the front and rear cover portions 110, 112 are separated by the thermal breaker 46. In this manner, the thermal breaker 46 can be used to substantially prevent cooling 114 from within the refrigerated compartment 20 from traveling through the outer cover 44 from the rear cover portion 112 of the outer cover 44 to the front cover portion 110, where the exterior surface 80 of the flipper mullion 38 is positioned.

The thermal breaker 46 is used to substantially prevent this cooling 114 from traveling from the rear cover portion 112 to the front cover portion 110 and acts as a thermal interrupting device that prevents cooling 114 from transferring to the front cover portion 110, and, potentially, into the exterior surface 80 of the flipper mullion 38. By preventing this thermal communication of cooling 114 from the rear cover portion 112 to the front cover portion 110, the thermal breaker 46 provides thermal resistance, absorbs cooling 114 and allows the front cover portion 110 and the metal plate 76 to maintain a higher temperature than the rear cover portion 112. Because the front cover portion 110 of the outer cover 44 has a higher temperature, less cooling 114 is transferred to the exterior surface 80 of the flipper mullion 38. Accordingly, less heating is required from the resistive heating element 78 of the flipper mullion 38 to prevent any potential condensation as a result of cooling 114 traveling to the exterior surface 80 of the flipper mullion 38. This results in less electricity being used within the flipper mullion 38 and the refrigerator 10 generally.

Referring again to FIGS. 3-5, the first and second gaskets 28, 30 of the opposingly hinged doors 24 can each include flap members 34 that extend from the first and second gaskets 28, 30, respectively, and engage an interior portion of the respective first and second doors 40, 42. In this manner, the flap members 34 of the first and second gaskets 28, 30 are configured to prevent the flow of cooled air from the refrigerated compartment 20 to the front portion of the flipper mullion 38 via the first and second gaskets 28, 30. Accordingly, by preventing the flow of air to the first and second gaskets 28, 30 of the flipper mullion 38, the flap members 34 can substantially prevent cooling 114 from also traveling to the exterior surface 80 of the flipper mullion 38. As with the thermal breakers 46, the flap members 34 are used to increase thermal resistance and substantially prevent the exterior surface 80 of the flipper mullion 38 from receiving cooling 114 from the refrigerated compartment 20 that may result in condensation forming on the exterior surface 80 of the flipper mullion 38. By preventing cooling 114 from reaching the exterior surface 80 of the flipper mullion 38, the heating assembly 74 disposed within the flipper mullion 38 does not have to provide as much heat energy, through the use of electricity, to raise the temperature of the exterior surface 80 of the flipper mullion 38, as less cooling 114 is reaching the flipper mullion 38 as a result of the various features of the flipper mullion 38 including, but not limited to, the thermal breakers 46 and the flap members 34 of the gaskets of the pair of opposingly hinged doors 24.

Referring again to the embodiment illustrated in FIGS. 5 and 6, the outer cover 44 of the flipper mullion 38 can include one or more bubble apertures 52 that extend through the outer cover 44 of the flipper mullion 38. Additionally, the bubble gasket 48 can be disposed within the cavity 72 of the flipper mullion 38 proximate the bubble apertures 52 of the outer cover 44. In the various embodiments, the bubble gasket 48 can be coextruded with the outer cover 44 during manufacture. Alternatively, the bubble gasket 48 can be separately manufactured and installed within the outer cover 44 of the flipper mullion 38.

Referring again to the embodiment illustrated in FIGS. 5 and 6, it is contemplated that the bubble gasket 48 can be allowed to expand from the cavity 72 of the flipper mullion 38, through the one or more bubble apertures 52, and form the air bubble 54 that extends beyond the outer surface 120 of the outer cover 44 of the flipper mullion 38. It is contemplated that the air bubble 54 formed by the bubble gasket 48 and the bubble apertures 52 of the outer cover 44 can extend outward from the cover and can engage a portion of the interior portion 36 of the door 22. In this manner, the air bubble 54 substantially prevents the flow of air from the interior volume 16 of the refrigerated compartment 20 from reaching the outer cover 44 of the flipper mullion 38 and, in turn, the exterior surface 80 of the flipper mullion 38.

As discussed above, by preventing cooled air from the interior volume 16 of the refrigerated compartment 20 from reaching the front cover portion 110, the various features of the flipper mullion 38, including, but not limited to, the air bubble 54, the flap members 34, and the thermal breakers 46, can substantially prevent the transfer of thermal energy, in the form of cooling 114, from reaching the front portion of the outer cover 44, and in turn, the exterior surface 80 of the flipper mullion 38. Each of these features of the flipper mullion 38, in preventing cooling 114 from reaching the external surface of the flipper mullion 38, causes the external surface of the flipper mullion 38 to have a higher temperature than the internal portions of the flipper mullion 38 that extend into the refrigerated compartment 20 of the refrigerating appliance 10.

In having a higher temperature, the exterior surface 80 of the flipper mullion 38 requires less heating from the heating assembly 74 of the flipper mullion 38 to prevent condensation. In turn, the heating assembly 74 requires less wattage to heat the exterior surface 80 of the flipper mullion 38 to prevent condensation. In testing the various aspects of the flipper mullion 38 disclosed herein, it has been found that the use of one or more of the above-described features can result in a significant reduction in the use of electrical power delivered to the heating element of the flipper mullion 38. In some instances, as few as 8 watts, or as low as 1 watt, may be needed to operate the heating assembly 74 of the flipper mullion 38 to prevent condensation.

Referring again to the embodiment illustrated in FIGS. 2, 5 and 6, the air bubble 54 formed by the bubble gasket 48 extending through the bubble apertures 52 can be configured to have an internal air pressure sufficient to allow the air bubble 54 to extend to an interior portion 36 of the door 22 of the refrigerating appliance 10. It is also contemplated that the internal air pressure of the air bubble 54 is low enough such that the flipper mullion 38 is allowed to rotate between the parallel and perpendicular positions 100, 102 when the first door 40 is moved to the open position. In this manner, when the flipper mullion 38 moves from the parallel to perpendicular positions 100, 102, the air bubble 54 is allowed to distort, deflect, or otherwise be manipulated to allow the flipper mullion 38 to move to the perpendicular position 102 without substantial interference from the air bubble 54. Similarly, the flap members 34 of the first and second gaskets 28, 30 of the respective first and second doors 40, 42 are also configured to be flexible enough such that the flap members 34 do not substantially interfere with the movement of the flipper mullion 38 as the flipper mullion 38 moves between the parallel and perpendicular positions 100, 102.

Referring again to FIGS. 1-6, it is contemplated that the outer cover 44 of the flipper mullion 38 can be made of various materials that can include, but are not limited to, plastic, composite, metal, combinations thereof, and other substantially rigid materials. According to the various embodiments, it is contemplated that the outer cover 44, while being separated into front and rear cover portions 110, 112 through the use of the thermal breakers 46, can be a single unitary piece that extends from one side of the metal plate 76 around the outer surface 120 of the flipper mullion 38 to engage the other side of the metal plate 76. In such embodiments, it is contemplated that the outer surface 120 of the flipper mullion 38 can be made up entirely of the metal plate 76 and the outer cover 44 of the flipper mullion 38.

Referring again to FIGS. 3-6, it is contemplated that the thermal breakers 46 disposed within the outer cover 44 of the flipper mullion 38 can be positioned in various locations along the flipper mullion 38. Such locations can include, but are not limited to, opposing sides of the flipper mullion 38, adjacent to the bubble apertures 52 of the outer cover 44, combinations of these locations, as well as other locations along the outer cover 44 of the flipper mullion 38. Additionally, it is contemplated that the breakers can be disposed at the joint 130 between the metal plate 76 and the outer cover 44 to further prevent thermal transmission of cooling 114 between the outer cover 44 and the metal plate 76.

According to the various embodiments, it is contemplated that the thermal breakers 46 can be made of any one of various heat resistive materials that can include, but are not limited to, rubber, silicone, one or more thermoplastic elastomers, polyphenylene ether, combinations thereof, or other similar heat-resistant materials. Similarly, the flap members 34 extend from the first and second gaskets 28, 30 of the first and second doors 40, 42 can also be made of heat resistant materials similar to those of the thermal breakers 46. It is contemplated that the material of the flap members 34 can be substantially more flexible than that of the thermal breakers 46 in order to allow for the flexibility of the flap members 34 during operation of the flipper mullion 38 between the parallel and perpendicular positions 100, 102. It is also contemplated that the flap members 34 and thermal breakers 46 can be made of the same material.

Referring again to the embodiment illustrated in FIGS. 2, 5 and 6, the bubble apertures 52 disposed within the cover of the flipper mullion 38 can be disposed on one side of the outer cover 44 nearer the first door 40. It is also contemplated that the bubble apertures 52 can be disposed on both sides and the bubble gasket 48 extends along both sides of the outer surface 120 of the outer cover 44 such that air bubbles 54 can be formed on both sides of the flipper mullion 38 to engage the first and second doors 40, 42 that enclose the refrigerated compartment 20. According to various embodiments, the bubble aperture 52 can include a single elongated aperture that extends substantially the height of the flipper mullion 38 such that one large air bubble 54 is formed as the bubble gasket 48 moves through the bubble aperture 52 defined within the outer cover 44 of the flipper mullion 38. It is also contemplated that the outer cover 44 can include a plurality of smaller apertures that extend along the entire length of the flipper mullion 38, such that a plurality of air bubbles 54 are formed as the bubble gasket 48 extends through at least a portion of the bubble apertures 52 defined within the outer cover 44.

Referring again to FIGS. 7 and 8, the flipper mullion 38 for an appliance, such as a refrigerating appliance 10, can include the outer cover 44 that is coupled to a hinge 140 for the flipper mullion 38. The outer cover 44 is rotationally operable about the hinge 140 between an extended position (corresponding to the parallel position 100) and a folded position (corresponding to the perpendicular position 102) relative to the hinge 140. A gasket 142 engages at least a fastening portion 144 of the outer cover 44. The gasket 142 and the outer cover 44 cooperate to define the outer surface 120, wherein an interior surface 146 of a flexible portion 148 of the gasket 142 defines an insulating space 150 that is positioned opposite a front exterior surface 80 of the outer cover 44. As discussed above, the exterior surface 80 of the outer cover 44 can include the metal plate 76 that serves as the resistive heating element 78 for the flipper mullion 38 and serves to prevent condensation from forming on the exterior surface 80 of the flipper mullion 38.

Referring again to FIGS. 7 and 8, the gasket 142 can include a rigid portion 160 that defines a first edge 162 of the gasket 142, wherein the first edge 162 of the gasket 142 engages the fastening portion 144 of the outer cover 44. It is contemplated that the first edge 162 of the gasket 142 and the fastening portion 144 of the outer cover 44 can define a labyrinth-type seal 164 that serves to retain the first edge 162 of the gasket 142 within the fastening portion 144 of the outer cover 44. According to the various embodiments, the rigid portion 160 of the gasket 142 can include various materials that can include, but are not limited to, rubber, plastic, a thermoplastic elastomer, combinations thereof, and other similar materials that are at least partially rigid to structurally support the engagement between the first edge 162 of the gasket 142 and the fastening portion 144 of the outer cover 44.

Referring again to FIGS. 7 and 8, it is contemplated that the gasket 142 can include a second edge 170 that engages a securing portion 172 of the outer cover 44. In such an embodiment, the flexible portion 148 of the gasket 142 extends over a rear surface 174 of the outer cover 44 to engage the securing portion 172 of the outer cover 44. According to this configuration, the insulating space 150 extends between the flexible portion 148 of the gasket 142 and the rear surface 174 of the outer cover 44. It is contemplated that the second edge 170 of the gasket 142 extends through a securing aperture 168 and is retained therein by any one of various securing formations 176 of the gasket 142, formed within the second edge 170 of the gasket 142. Such geometric securing formations 176 can include, but are not limited to, polygonal formations, various flanges 178, "arrow" shaped formations, combinations thereof, and other similar securing formations 176. By way of example, and not limitation, the second edge 170 of the gasket 142 can include a securing formation 176 having an "arrow" type cross section, such that when the second edge 170 of the gasket 142 is inserted into the securing aperture 168 of the outer cover 44, flanges 178 of the "arrow" are biased inward such that the second edge 170 can be moved through the securing aperture 168. Once the second edge 170 is moved through the securing aperture 168, the flanges 178 of the "arrow" shaped securing formation 176 deflect outward to their original shape. Accordingly, after the second edge 170 is disposed through the securing aperture 168 defined within the securing portion 172 of the outer cover 44, the shape of the securing formation 176 of the second edge 170 of the gasket 142 is larger than the securing aperture 168 such that the second edge 170 of the gasket 142 cannot be pulled back out from the securing aperture 168 without causing damage to either the gasket 142 or the outer cover 44.

Figure 7:
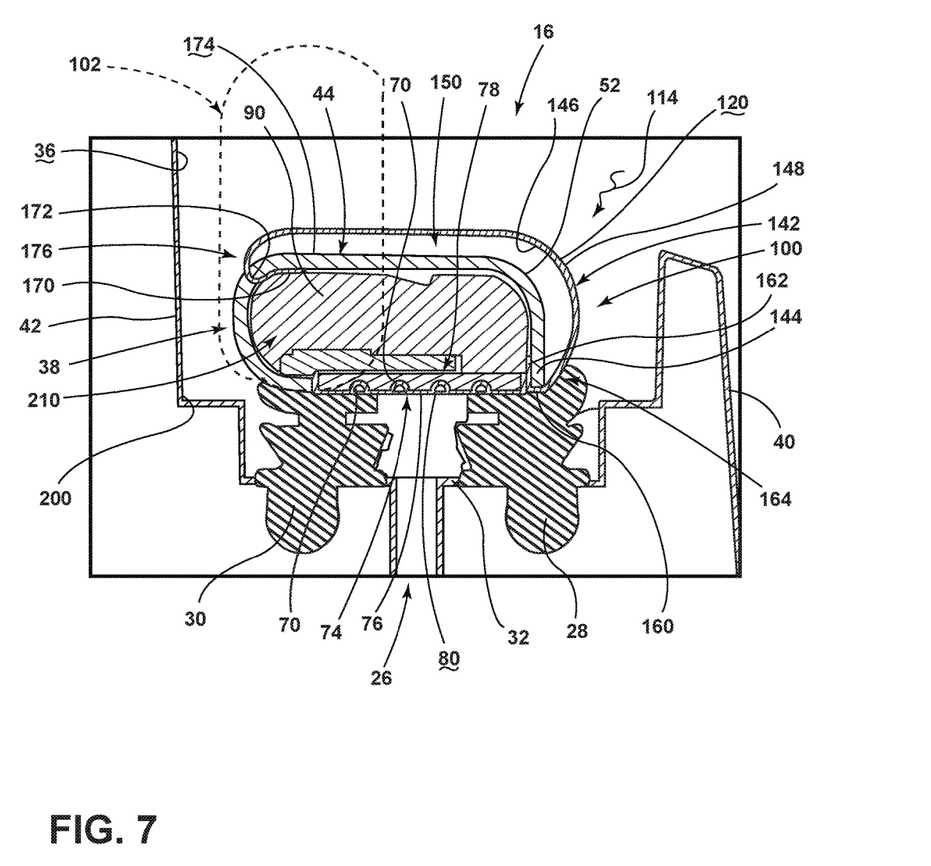
FIG. 7 is a cross-sectional view of an aspect of the low wattage flipper mullion incorporating a gasket extending across the back surface of the flipper mullion.
Figure 8:
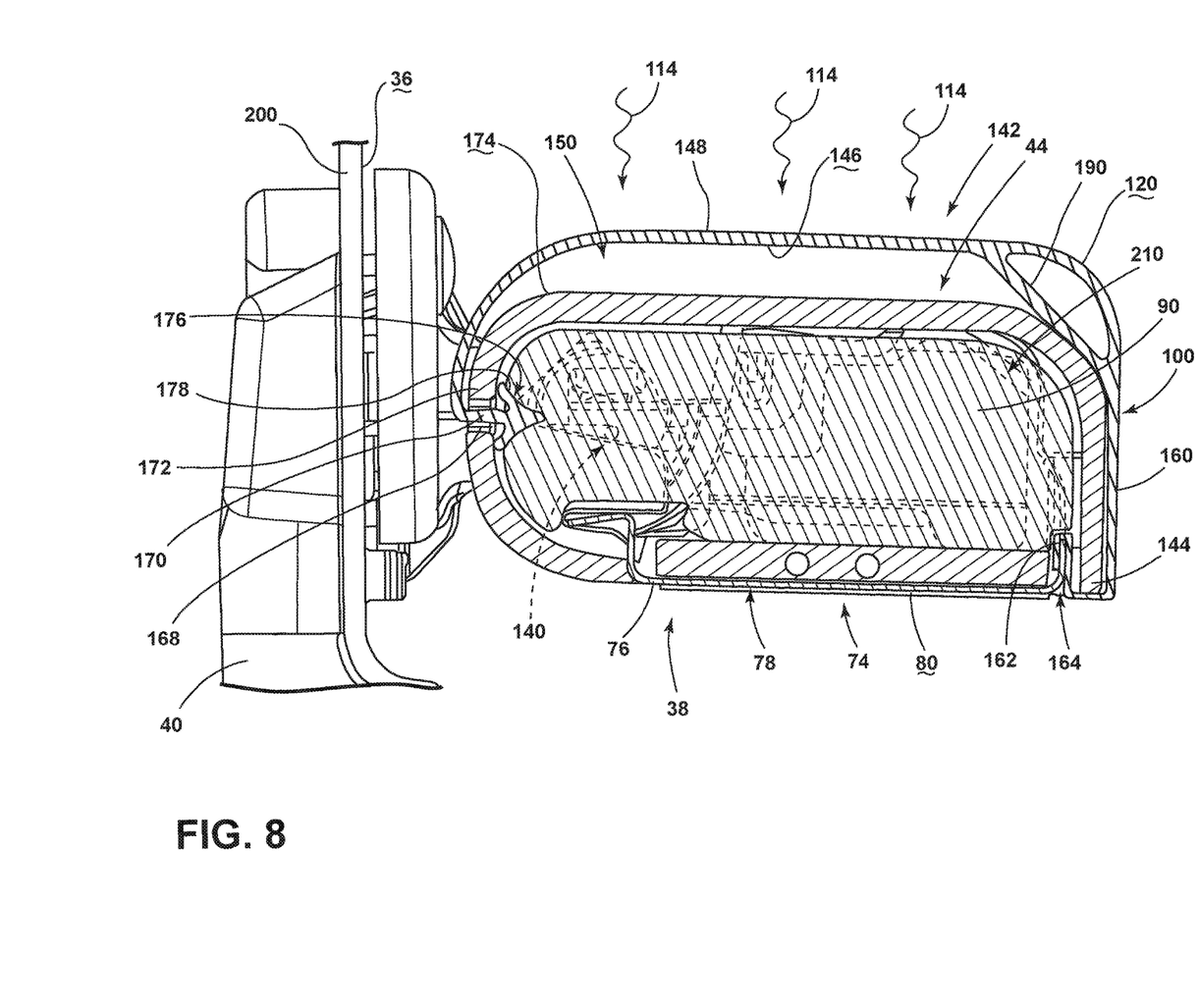
FIG. 8 is an enlarged cross-sectional view of an aspect of the low wattage flipper mullion incorporating a gasket that defines an insulating airspace at the back of the flipper mullion.

It is contemplated that the flexible portion 148 of the gasket 142, which can include the second edge 170 of the gasket 142, can be made of various materials that can include, but are not limited to, rubber, flexible plastic, various polymers, polyphenylene ether, combinations thereof, and other similar substantially flexible materials that can be used to form the insulating space 150 within the flexible portion 148 of the gasket 142.

According to the various embodiments, it is contemplated that the rigid portion 160 and flexible portion 148 of the gasket 142 can be formed in a single mold, through the injection of two separate materials, one material for the rigid portion 160 of the gasket 142 and one material for the flexible portion 148 of the gasket 142. In this manner, the gasket 142, including the rigid and flexible portions 148, can be formed of a single continuous piece that is free of any joints defined between the transition from the rigid portion 160 to the flexible portion 148 of the gasket 142. It is also contemplated that the flexible portion 148 of the gasket 142 can include an interior structural member 190 that can be used to buttress at least a portion of the flexible portion 148, or can be used to be used to support a portion of the flexible member by having the structural member 190 extend from a portion of the rigid portion 160 to the flexible portion 148 of the gasket 142. It is contemplated that the structural member 190 can be made of a material that is the same as, or substantially similar to, that of the rigid and/or flexible portions 148 of the gasket 142.

According to the various embodiments, it is contemplated that the second edge 170 of the gasket 142 can extend to a portion of the inner liner 200 of the door of the refrigerator 10, rather than to another portion of the outer cover 44 of the flipper mullion 38. In such an embodiment, as the flipper mullion 38 moves between the extended parallel and folded perpendicular positions 100, 102, the flexible portion 148 of the gasket 142 deflects to accommodate the positioning of the flipper mullion 38 with respect to the inner liner 200 of the door to which the flipper mullion 38 is hingedly attached.

Referring again to FIGS. 7 and 8, where the gasket 142 extends from the fastening portion 144 of the outer cover 44 to the securing portion 172 of the outer cover 44, it is contemplated that the insulating space 150 defined by the gasket 142 can be a hermetically sealed gap or insulating space 150 defined by the interior surface 146 of the gasket 142. It is contemplated that the outer cover 44 can include an interior cavity that defines a mullion insulating cavity 210. In such an embodiment, the mullion insulating cavity 210 can be separated from the insulating space 150 defined by the flexible portion 148 of the gasket 142. In such an embodiment, a portion of the outer cover 44 can be positioned such that the flexible portion 148 of the gasket 142 extends over the rear surface 174 of the outer cover 44 such that the insulating space 150 also extends across the rear surface 174 and is defined between the rear surface 174 of the outer cover 44 and the interior surface 146 of the flexible portion 148 of the gasket 142.

Referring again to FIGS. 1, 7 and 8, it is contemplated that the flipper mullion 38 can be attached to a door panel 220 for the appliance, such as the refrigerator 10. In such an embodiment, the door panel 220 can include an outer wrapper 222 and an inner liner 200 that define a door cavity. The flipper mullion 38 can be attached to the inner liner 200 and is hingedly operable between the extended and folded positions. The gasket 142 defines a portion of an outer surface 120 of the flipper mullion 38 proximate the interior refrigerated compartment 20 of the refrigerator 10. The gasket 142 can include the flexible portion 148 that defines the insulating space 150 within the flipper mullion 38, wherein the flexible portion 148 of the gasket 142 engages the inner liner 200 when the flipper mullion 38 is moved to the folded perpendicular position 102. According to the various embodiments, it is contemplated that the outer wrapper 222 and inner liner 200 form a door panel 220 that is hingedly connected to the cabinet of the refrigerator 10, such as French doors of a French door bottom mount appliance. In this configuration, the flipper mullion 38 can be connected to the door panel 220 to operate about a vertical axis, such as between the two French doors of the appliance. It is also contemplated that the flipper mullion 38 can be positioned along top or bottom edges of the door panel 220 such that the flipper mullion 38 operates about a horizontal axis between the folded perpendicular and extended parallel positions 102, 100.

According to the various embodiments, it is also contemplated that the flipper mullion 38 can be attached to a door panel 220 that defines a drawer 230 for an appliance. In such an embodiment, as the drawer 230 is moved between the open and closed positions, the flipper mullion 38 operates about a horizontal axis between the folded perpendicular and extended parallel positions 102, 100. In such an embodiment, it is contemplated that the flipper mullion 38 can define a portion of a mullion or false mullion that extends horizontally across a portion of the refrigerator 10.

Referring again to FIGS. 1, 2, 7 and 8, the refrigerator 10 can include a plurality of sidewalls 12 and a back wall 14 to define an interior refrigerated compartment 20. The first and second doors 40, 42 are hingedly attached to opposing sidewalls 12 and a plurality of sidewalls 12. Each of the first and second doors 40, 42 is separately and selectively operable between a respective open position and a respective closed position 82. In this manner, a seam 26 is defined between the first and second doors 40, 42 when each of the first and second doors 40, 42 is in the respective closed position 82. The flipper mullion 38 is hingedly attached to the first door 40 and extends across the seam 26 defined between the first and second doors 40, 42. The flipper mullion 38 is hingedly attached to the first door 40, wherein the flipper mullion 38 engages the second door 42 when both of the first and second doors 40, 42 are in the respective closed positions 82. The gasket 142 defines a portion of an outer surface 120 of the flipper mullion 38 proximate the interior refrigerated compartment 20, where the gasket 142 includes the flexible portion 148 that defines the insulating space 150 within the flipper mullion 38. The flipper mullion 38 is hingedly operable between the extended parallel position 100 corresponding to the closed position 82 of the first door 40, and a folded perpendicular position 102 corresponding to the open position of the first door 40. In this manner, the flexible portion 148 of the gasket 142 is adapted to engage an interior portion 36 of the first door 40 when the flipper mullion 38 is in the folded perpendicular position 102. In this manner, the gasket 142 is adapted to at least partially deflect when in engagement with the interior portion 36 of the first door 40 to maintain the insulating space 150 within the flipper mullion 38.

Referring again to FIGS. 7 and 8, it is contemplated that the rigid outer cover 44 of the flipper mullion 38 can include an interior cavity defining the mullion insulating cavity 210. The mullion insulating cavity 210 can be configured to define an at least partial vacuum, wherein the mullion insulating cavity 210 contains an insulating material 90 to define a vacuum insulated structure. According to various embodiments, a vacuum insulated panel can be installed within the mullion insulating cavity 210 to provide additional insulation for the flipper mullion 38.

Referring again to FIGS. 1-8, the various insulating features described herein, including the insulating space 150 defined by the interior surface 146 of the flexible portion 148 of the gasket 142 serves to increase thermal resistance and limit the transfer of thermal energy, such as cooling 114 or heating, through the flipper mullion 38. The air space defined by the flexible portion 148 of the gasket 142 serves as an insulating space 150 that slows the transfer of cooling from the refrigerated compartment 20 of the appliance and through portions of the flipper mullion 38 as cooling 114 is more efficiently contained within the refrigerating compartment 20. In this manner, the mullion insulating cavity 210 of the flipper mullion 38 typically experiences a higher temperature than that of the interior compartment of the refrigerator 10. The use of various insulating materials within the mullion insulating cavity 210 further reduces the transfer of thermal energy through the flipper mullion 38 such that minimal thermal energy from the refrigerated compartment 20 of the refrigerator 10 are able to reach the exterior surface 80 of the flipper mullion 38. Accordingly, the exterior surface 80 of the flipper mullion 38 is maintained at a temperature that is much closer to the outer environmental temperature surrounding the refrigerator 10. Based on this configuration, the metal plate 76 extending through the flipper mullion 38 and which forms a portion of the heating assembly 74 from the flipper mullion 38 requires less electricity to prevent condensation on the exterior surface 80 of the flipper mullion 38.

By way of example, and not limitation, a conventional flipper mullion 38 may require within a range of approximately 9 watts of electricity to provide sufficient heating to the exterior surface 80 of the flipper mullion 38 to prevent condensation. It is contemplated that the configurations of the flipper mullion 38 described herein may reduce the electrical power required to operate the heating assembly 74 of the flipper mullion 38 by approximately 1 to approximately 2 watts or more to achieve the same result as that of a conventional flipper mullion. In this manner, the thermal resistance provided by the insulating space 150 defined by the flexible portion 148 of the gasket 142, as well as thermal resistance provided by various insulating materials contained within the mullion insulating cavity 210, have an overall insulating effect within the flipper mullion 38 that requires less resources to heat the exterior surface 80 of the mullion, thereby using less electricity over the lifespan of the refrigerator 10.

It will be understood by one having ordinary skill in the art that construction of the described device and other components is not limited to any specific material. Other exemplary embodiments of the device disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

The invention claimed is:

1. A refrigerating appliance comprising:
   a plurality of sidewalls and a back wall that define an interior compartment;
   first and second doors that are hingedly attached to opposing sidewalls of the plurality of sidewalls, each of the first and second doors separately and selectively operable between respective open and closed positions, wherein a seam is defined between the first and second doors when each of the first and second doors is in the respective closed position;
   a single flipper mullion selectively sealing the seam and attached to the first door and extending across the seam defined between the first and second doors, wherein the flipper mullion is hingedly attached to the first door, and wherein the flipper mullion engages the second door when both of the first and second doors are in respective closed positions; and
   a gasket that defines a portion of an outer surface of the flipper mullion proximate the interior compartment, the gasket including a flexible portion that defines an insulating space within the flipper mullion, wherein the gasket extends from a metal plate that defines an exterior surface of the flipper mullion to a securing portion defined within a rigid outer cover of the flipper mullion, wherein the gasket proximate a first edge defines a rigid portion that engages the metal plate, wherein the metal plate is part of a heating assembly of the flipper mullion.

2. The refrigerating appliance of claim 1, wherein the flipper mullion is hingedly operable between an extended position which corresponds to the closed position of the first door, and a folded position corresponding to the open position of the first door, the folded position being approximately perpendicular to the extended position, wherein the flexible portion of the gasket engages a portion of an interior surface of the first door, and wherein when the flipper mullion is in the folded position, the flexible portion of the gasket at least partially deflects to maintain the insulating space within the flipper mullion.

3. The refrigerating appliance of claim 1, wherein the gasket includes the first edge that engages a fastening portion of the metal plate and extends from the first edge over a rear surface of the rigid outer cover, wherein the insulating space is at least partially defined between the flexible portion of the gasket and the rigid outer cover.

4. The refrigerating appliance of claim 3, wherein the gasket includes a second edge that engages the securing portion of the rigid outer cover.

5. The refrigerating appliance of claim 3, wherein the flexible portion of the gasket extends over the rear surface of the rigid outer cover, wherein the insulating space extends across the rear surface.

6. The refrigerating appliance of claim 1, wherein the insulating space is hermetically sealed.

7. The refrigerating appliance of claim 3, wherein the rigid outer cover includes an interior cavity defining a mullion insulating cavity.

8. The refrigerating appliance of claim 7, wherein the mullion insulating cavity includes an at least partial vacuum, and wherein the mullion insulating cavity contains an insulating material to define a vacuum insulated structure.

9. A flipper mullion for an appliance, the flipper mullion comprising:
   an outer cover coupled to a hinge, wherein the outer cover is rotationally operable between an extended position and a generally perpendicular folded position relative to the hinge; and
   a gasket that engages at least a fastening portion of a metal heating plate of the outer cover, wherein the gasket and the outer cover cooperate to define an outer surface, and wherein an interior surface of a flexible portion of the gasket defines an insulating space that is positioned opposite a front surface of the metal heating plate, wherein a first edge of the gasket includes a rigid portion that engages the metal heating plate, and wherein the metal heating plate is part of a heating assembly of the outer cover.

10. The flipper mullion of claim 9, wherein the first edge of the gasket engages the fastening portion.

11. The flipper mullion of claim 10, wherein the rigid and flexible portions of the gasket are formed of a single continuous piece.

12. The flipper mullion of claim 10, wherein the rigid portion of the gasket includes a thermoplastic elastomer.

13. The flipper mullion of claim 9, wherein the flexible portion of the gasket includes polyphenylene ether.

14. The flipper mullion of claim 9, wherein the outer cover includes an interior cavity defining a mullion insulating cavity, wherein the mullion insulating cavity is separated from the insulating space defined by the flexible portion of the gasket.

15. The flipper mullion of claim 14, wherein the mullion insulating cavity includes an at least partial vacuum, and wherein the mullion insulating cavity contains an insulating material to define a vacuum insulated structure.

16. The flipper mullion of claim 9, wherein the gasket includes a second edge that engages a securing portion of the outer cover wherein the flexible portion of the gasket extends over a rear surface of the outer cover, wherein the insulating space extends across the rear surface.

17. A door panel for an appliance, the door panel comprising:
   an outer wrapper and an inner liner;
   a flipper mullion having a rigid outer cover attached to the inner liner and hingedly operable between an extended position, and a generally perpendicular folded position; and
   a gasket that defines a portion of an outer surface of the flipper mullion proximate an interior compartment, the gasket including a flexible portion that cooperates with the rigid outer cover to define an insulating space therebetween and a mullion insulating cavity within the rigid outer cover of the flipper mullion, wherein the gasket engages the inner liner when the flipper mullion is in the generally perpendicular folded position, wherein a first edge of the gasket includes a rigid portion that engages a metal plate of the rigid outer cover, and wherein the metal plate is part of a heating assembly of the flipper mullion.

18. The door panel of claim 17, wherein the outer wrapper and inner liner are adapted to be hingedly connected to an appliance cabinet.

19. The door panel of claim 17, wherein the flipper mullion operates about a vertical axis.

* * * * *